United States Patent
Anderson et al.

(10) Patent No.: US 6,376,059 B1
(45) Date of Patent: Apr. 23, 2002

(54) POLYETHYLENE FOAMS AND METHODS OF THEIR PRODUCTION

(75) Inventors: Jere R. Anderson, Newburyport; Kelvin T. Okamoto, Boston, both of MA (US)

(73) Assignee: Trexel, Inc., Woburn, MA (US)

( * ) Notice: Subject to any disclaimer, the term of this patent is extended or adjusted under 35 U.S.C. 154(b) by 0 days.

(21) Appl. No.: 09/241,350

(22) Filed: Feb. 2, 1999

Related U.S. Application Data

(63) Continuation-in-part of application No. PCT/US98/27118, filed on Dec. 18, 1998.
(60) Provisional application No. 60/107,754, filed on Nov. 10, 1998, and provisional application No. 60/068,173, filed on Dec. 19, 1997.

(51) Int. Cl.[7] .................................................. B32B 3/26
(52) U.S. Cl. ...................... 428/314.8; 428/326; 521/81; 521/88; 264/50; 264/54; 264/56
(58) Field of Search .............................. 428/314.8, 326; 521/81, 88; 264/50, 54, 56

(56) References Cited

U.S. PATENT DOCUMENTS

| | | |
|---|---|---|
| 3,102,865 A | 9/1963 | Sneary et al. |
| 3,227,664 A | 1/1966 | Blades et al. |
| 3,227,784 A | 1/1966 | Blades et al. |
| 3,277,221 A | 10/1966 | Parrish |
| 3,375,211 A | 3/1968 | Parrish |
| 3,375,212 A | 3/1968 | Bonner, Jr. |
| 3,384,531 A | 5/1968 | Parrish |
| 3,491,032 A | 1/1970 | Skochdopole et al. |
| 3,584,090 A | 6/1971 | Parrish |
| 3,637,458 A | 1/1972 | Parrish |
| 3,787,543 A | 1/1974 | Parrish |
| 3,812,225 A | 5/1974 | Hosoda et al. |
| 4,264,672 A | 4/1981 | Taylor-Brown et al. |
| 4,473,665 A | 9/1984 | Martini-Vvedensky et al. |
| 4,569,950 A | 2/1986 | Hoshi et al. |

(List continued on next page.)

FOREIGN PATENT DOCUMENTS

| | | |
|---|---|---|
| EP | 0707935 | 4/1996 |
| EP | 0799853 | 10/1997 |
| EP | 0818292 | 1/1998 |
| GB | 1 456 171 | 11/1976 |
| WO | WO 89/00918 | 2/1989 |
| WO | WO 90/07546 | 7/1990 |
| WO | WO 95/24440 | 9/1995 |
| WO | WO 98/08667 | 3/1998 |
| WO | WO 98/31521 | 7/1998 |

OTHER PUBLICATIONS

Baldwin, D.F., et al., "A Processing System for the Extrusion of Microcellular Polymer Sheets: Shaping and Cell Growth Control", Cellular and Microcellular Materials, 53: 95–107, 1994.

Park, C.B. et al., "Effect of The Pressure Drop Rate on Cell Nucleation in Continuous Processing Of Microcellular Polymers", Polymer Engineering and Science, 35: 432–440, 1995.

Park, C.B. et al., "Filamentary Extrusion of Microcellular Polymers Using a Rapid Decompressive Element", Polymer Engineering & Science, 36: 34–48, 1996.

*Primary Examiner*—Necholus Ogden
(74) *Attorney, Agent, or Firm*—Wolf, Greenfield & Sacks, P.C.

(57) ABSTRACT

High-density polyethylene (HDPE) foams that are essentially free of residual chemical blowing agents and reaction-by-products of chemical blowing agent are provided. The HDPE foams can be either microcellular foams or conventional foams. She foams can be produced in extrusion, injection molding, and blow molding processes that utilize a physical blowing agent. Specific die designs useful for making high quality foams are described.

12 Claims, 3 Drawing Sheets

U.S. PATENT DOCUMENTS

| | | |
|---|---|---|
| 4,627,177 A | 12/1986 | Meyers |
| 4,761,256 A | 8/1988 | Hardenbrook et al. |
| 4,791,144 A | 12/1988 | Nagou et al. |
| 5,034,171 A | 7/1991 | Kiczek et al. |
| 5,110,998 A | 5/1992 | Muschiatti |
| 5,128,382 A | 7/1992 | Elliott, Jr. et al. |
| 5,158,986 A | 10/1992 | Cha et al. |
| 5,160,674 A | 11/1992 | Colton et al. |
| 5,182,307 A | 1/1993 | Kumar |
| 5,334,356 A | 8/1994 | Baldwin et al. |
| 5,358,675 A | 10/1994 | Campbell et al. |
| 5,468,530 A | 11/1995 | Götz et al. |
| 5,500,450 A | 3/1996 | Simandl et al. |
| 5,571,848 A | 11/1996 | Mortensen et al. |
| 5,670,102 A | 9/1997 | Perman et al. |
| 5,684,055 A | 11/1997 | Kumar et al. |
| 5,830,393 A | 11/1998 | Nishikawa et al. |
| 5,866,053 A | 2/1999 | Park et al. |
| 5,955,511 A | 9/1999 | Handa et al. |

POLYETHYLENE FOAMS AND METHODS OF THEIR PRODUCTION

RELATED APPLICATIONS

This application is a continuation-in-part of PCT application Ser. No. PCT/US98/27118, filed Dec. 18, 1998, which is a continuation-in-part of U.S. patent application Ser. No. 60/107,754 filed Nov. 10, 1998, and a continuation-in-part of U.S. patent application Ser. No. 60/068,173 filed Dec. 19, 1997.

FIELD OF THE INVENTION

The present invention relates generally to polymeric foam processing, and more particularly, to polyethylene foams and methods of their production

BACKGROUND OF THE INVENTION

Polymeric foams include a plurality of voids, also called cells, in a polymer matrix. By replacing solid plastic with voids, polymeric foams use less raw material than solid plastics for a given volume. Thus, by using polymeric foams in many applications instead of solid plastics, material costs are reduced.

Microcellular foams generally, have smaller cell sizes and higher cell densities than conventional polymeric foams. Typically, microcellular foams are defined as having average cell sizes of less than 100 microns and a cell density of greater than $10^6$ cells/cm$^3$ of solid plastic. In a typical continuous process for forming microcellular foam (e.g. extrusion), the pressure on a single-phase solution of blowing agent and polymer is rapidly dropped to nucleate the cells. The nucleation rate must be high enough to form the microcellular structure.

Several patents describe aspects of microcellular materials and microcellular processes. U.S. Pat. No. 4,473,665 (Martini-Vvedensky, et al.; Sep. 25, 1984) describes a process for making foamed polymer having cells less than about 100 microns in diameter. In a technique of Martini-Vvedensky, et al., a material precursor is saturated with a blowing agent, the material is placed under high pressure, and the pressure is rapidly dropped to nucleate the blowing agent and to allow the formation of cells. The material then is frozen rapidly to maintain a desired distribution of microcells.

U.S. Pat. No. 5,158,986 (Cha, et al.; Oct. 27, 1992) describes formation of microcellular polymeric material using a supercritical fluid as a blowing agent. In a batch process of Cha, et al., a plastic article is submerged at pressure in supercritical fluid for a period of time, and then quickly returned to ambient conditions creating a solubility change and nucleation. In a continuous process, a polymeric sheet is extruded, and then can be run through rollers in a container of supercritical fluid at high pressure, and then exposed quickly to ambient conditions. In another continuous process, a supercritical fluid-saturated molten polymeric stream is established. The polymeric stream is rapidly heated, and the resulting thermodynamic instability (solubility change) creates sites of nucleation, while the system is maintained under pressure preventing significant growth of cells. The material then is injected into a mold cavity where pressure is reduced and cells are allowed to grow.

International patent publication no. WO 98/08667 (Burnham et al.) provides methods and systems for producing microcellular material, and microcellular articles. In one method of Burnham et al., a fluid, single phase solution of a precursor of foamed polymeric material and a blowing agent is continuously nucleated by dividing the stream into separate portions and separately nucleating each of the separate portions. The divided streams can be recombined into a single stream of nucleated, fluid polymeric material. The recombined stream may be shaped into a desired form, for example, by a shaping die. Burnham et al. also describe a die for making advantageously thick microcellular articles, that includes a multiple pathway nucleation section. Other methods describe the fabrication of very thin microcellular products, as well. In particular, a method for continuously extruding microcellular material onto a wire, resulting in very thin essentially closed cell microcellular insulating coating secured to the wire, is provided. In some of the methods, pressure drop rate is an important feature and techniques to control this and other parameters are described.

High-density polyethylene (HDPE) has traditionally been a difficult material to process as a foam. This, in part, arises from the low melt strength of HDPE. Processes that employ chemical blowing agents have been developed to produce foams from high-density polyethylene. Additionally, HDPE foams have been produced by batch processes (see, for example, U.S. Pat. No. 5,158,986). However, the applicants are unaware of extruded or injection molded foams from HDPE produced without the use of chemical blowing agents or without the addition of another polymeric component, for example low density polyethylene (HDPE) or linear low density polyethylene (HDPE). It is an object of the invention, therefore, to provide a non-batch process for producing HDPE foam using a physical blowing agent.

SUMMARY OF THE INVENTION

The invention provides HDPE foams and processes for their production. The HDPE foams can be formed in extrusion, injection molding, or blow molding processes using physical blowing agents, and thus the foams are essentially free of residual chemical blowing agent and reaction-by-products of chemical blowing agent. The HDPE foams can be produced over a broad density range and formed into a variety of articles.

In one aspect, the invention provides a foam article that includes a matrix of polymeric material including a plurality of cells. The polymeric material consists essentially of high-density polyethylene and is essentially free of residual chemical blowing agent and reaction-by-products of chemical blowing agent. The article has a shape essentially identical to that of a continuous extrudate or the interior of a mold.

In another aspect, the invention provides a method of forming a foam article. The method includes the step of conveying polymeric material in a downstream direction in a polymer processing apparatus. The polymeric material consists essentially of high-density polyethylene. The method further includes the steps of introducing a physical blowing agent into the polymeric material in the polymer processing apparatus and forming a foam article from the polymeric material.

Among other advantages, the invention provides processes for producing HDPE foams that use physical blowing agents instead of chemical blowing agents. Physical blowing agents are often less expensive than chemical blowing agents. Finally, processes using physical blowing agents are more efficient and reliable, not having to depend on a chemical reaction to determine the amount of blowing agent released during the foaming process.

Furthermore, the invention provides an HDPE foam containing low amounts of, or essentially free of residual chemical blowing agent and reaction-by-products of chemical blowing agents. In some cases, the presence of residual chemical blowing agents and reaction-by-products of chemical blowing agents in a material is detrimental and can restrict its use. The HDPE foams, in accordance to the invention, are advantageously suitable for applications, such as food packaging, and are more easily recycled without adverse effects.

In another aspect the invention provides specific die designs useful for making high quality polymeric foams, and particularly microcellular HDPE foams. The die can be provided as part of a system of extrusion. The die includes a nucleating pathway that decreases in cross-section in a downstream direction with an included angle of greater than 4°.

In another embodiment of this aspect of the invention a method is provided that involves introducing a single-phase solution of polymeric material and blowing agent into an inlet of a polymeric foaming die, nucleating the single-phase solution in a nucleating pathway that decreases in a downstream direction with an included angle of greater than 4° to form a nucleated polymeric stream, and releasing the nucleated stream as a polymeric foam extrudate to form a nucleated polymeric stream.

In another embodiment a forming die according to this aspect of the invention includes a nucleating pathway constructed such that when a single-phase, non-nucleated solution of polymeric material and blowing agent is introduced into the die and conveyed through the die at a flow rate of about 100 pounds per hour, nucleation of the solution occurs to form a nucleated polymeric stream that is released from the die in a period of time of no more than about 0.002 second after nucleation.

In another embodiment of this aspect of the invention a method is provided that involves introducing a single-phase, non-nucleated solution of polymeric material and blowing agent into a polymer forming die. Within the die the solution is nucleated to form a nucleated polymeric stream. The stream is released as a polymeric microcellular extrudate from an outlet of the die in a period of time of no more than about 0.002 second after nucleation.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
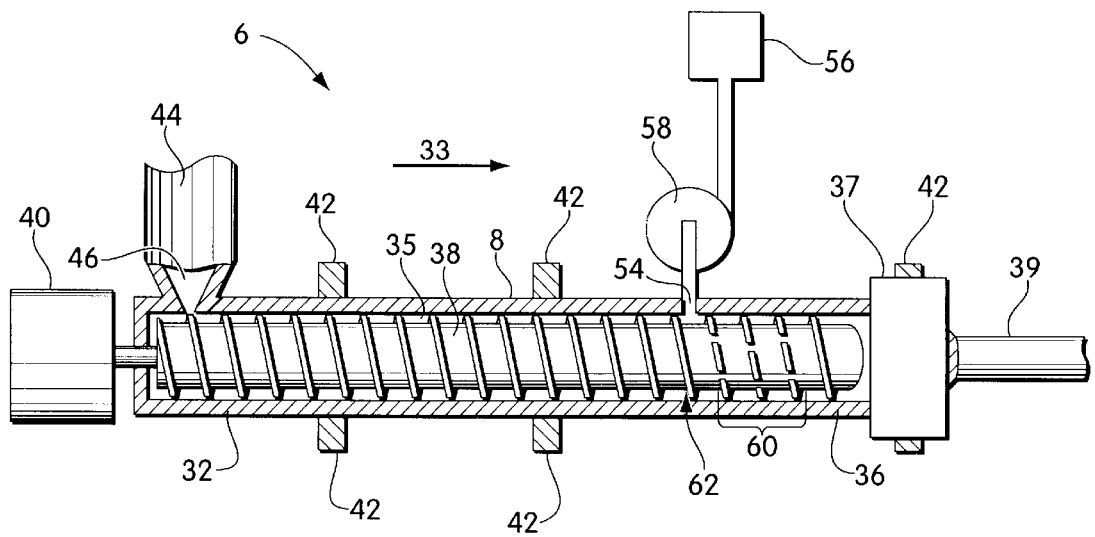
FIG. 1 is a schematic illustration of an extrusion system.

Commonly owned, co-pending international patent publication no. WO 98/08667 published Mar. 5, 1998, commonly owned, co-pending international patent publication no. WO 98/31521 published Jul. 23, 1998, commonly owned, co-pending international patent application Ser. No. PCT/US98/27118, filed Dec. 18, 1998, commonly owned, co-pending U.S. provisional patent application serial No. 60/068,173 entitled "Microcellular Extrusion/Blow Molding Process and Article Made Thereby", filed Dec. 19, 1997, commonly owned, co-pending U.S. provisional patent application serial No. 60/107,754 entitled "Microcellular Extrusion/Blow Molding Process and Article Made Thereby", filed Nov. 10, 1998, all are incorporated by reference.

The various embodiments and aspects of the invention will be better understood from the following definitions. As used herein. "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a mixture in which sites of aggregation of at least several molecules of blowing agent are formed. Nucleation defines that transitory state when gas, in solution in a polymer melt, comes out of solution to form a suspension of bubbles within the polymer melt. Generally this transition state is forced to occur by changing the solubility of the polymer melt from a state of sufficient solubility to contain a certain quantity of gas in solution to a state of insufficient solubility to contain that same quantity of gas in solution. Nucleation can be effected by subjecting the homogeneous, single-phase solution to rapid thermodynamic instability, such as rapid temperature change, rapid pressure drop, or both. Rapid pressure drop can be created using a nucleating pathway, defined below. Rapid temperature change can be created using a heated portion of an extruder, a hot glycerine bath, or the like.

A "nucleating agent" is a dispersed agent, such as talc or other filler particles, added to a polymer and able to promote formation of nucleation sites from a single-phase, homogeneous solution. Thus "nucleation sites" do not define locations, within a polymer, at which nucleating agent particles reside. A "filler" is a dispersed particle added to replace solid plastic. "Nucleated" refers to a state of a fluid polymeric material that had contained a single-phase, homogeneous solution including a dissolved species that is a gas under ambient conditions, following an event (typically thermodynamic instability) leading to the formation of nucleation sites. "Non-nucleated" refers to a state defined by a homogeneous, single-phase solution of polymeric material and dissolved species that is a gas under ambient conditions, absent nucleation sites. A "non-nucleated" material can include nucleating agent such as talc.

A "polymeric material/blowing agent mixture" can be a single-phase, non-nucleated solution of at least the two, a nucleated solution of at least the two, or a mixture in which blowing agent cells have grown.

"Essentially closed-cell" microcellular material is meant to define material that, at a thickness of about 200 microns, contains no connected cell pathway through the material.

"Nucleating pathway" is meant to define a pathway that forms part of microcellular polymeric foam extrusion apparatus and in which, under conditions in which the apparatus is designed to operate (typically at pressures of from about 1500 to about 30,000 psi upstream of the nucleator and at flow rates of greater than about 10 pounds polymeric material per hour), the pressure of a single-phase solution of polymeric material admixed with blowing agent in the system drops below the saturation pressure for the particular blowing agent concentration at a rate or rates facilitating rapid nucleation. A nucleating pathway defines, optionally with other nucleating pathways, a nucleation or nucleating region of a device of the invention.

"Reinforcing agent", as used herein, refers to auxiliary, essentially solid material constructed and arranged to add dimensional stability, or strength or toughness, to material. Such agents are typified by fibrous material as described in U.S. Pat. Nos. 4,643,940 and 4,426,470. "Reinforcing agent" does not, by definition, necessarily include filler or other additives that are not constructed and arranged to add dimensional stability. Those of ordinary skill in the art can test an additive to determine whether it is a reinforcing agent in connection with a particular material.

"High-density polyethylene" (HDPE), as used herein, refers to polyethylene having a density of greater than 0.94 g/cm$^3$. "Low-density polyethylene" (LDPE) as used herein, refers to polyethylene having a density of less than 0.94 g/cm$^3$.

In one set of embodiments, foam articles that consist essentially of high-density polyethylene (HDPE) are formed without the use of a chemical blowing agent. In such articles, HDPE is essentially the only polymeric component but the article includes any variety of additives as known in the art, such as a nucleating agent (e.g. talc). Such articles thus, are essentially free of residual chemical blowing agent and reaction-by-products of chemical blowing agent.

In some embodiments, the HDPE foam articles are conventional foams having an average cell size of larger than 100 microns. In other preferred embodiments, the HDPE foam articles are microcellular foams having average cell sizes of less than 100 microns. In some embodiments, microcellular material of the invention is produced having average cell size of less than about 50 microns. In some embodiments particularly small cell size is desired, and in these embodiments material of the invention has average cell size of less than about 30 microns, more preferably less than about 20 microns, more preferably less than about 10 microns, and more preferably still less than about 5 microns. The microcellular material preferably has a maximum cell size of about 100 microns or preferably less than about 75 microns. In embodiments where particularly small cell size is desired, the material can have maximum cell size of about 50 microns, more preferably about 35 microns, and more preferably still about 25 microns. A set of embodiments includes all combinations of these noted average cell sizes and maximum cell sizes. For example, one embodiment in this set of embodiments includes microcellular material having an average cell size of less than about 30 microns with a maximum cell size of about 50 microns, and as another example an average cell size of less than about 30 microns with a maximum cell size of about 35 microns, etc. That is, microcellular material designed for a variety of purposes can be produced having a particular combination of average cell size and a maximum cell size preferable for that purpose. Control of cell size is described in greater detail below. In some embodiments of this set, the HDPE foams have essentially closed cell structures.

The articles can be produced over a broad range of densities. In certain embodiments, the void volume is greater than 10%, in some embodiments greater than 20%, in other embodiments greater than 50%. In a preferred set of embodiments, the article has a void volume of between 10% and 40%.

The process of forming the high-density polyethylene foam articles employs the use of a physical blowing agent, as described further below. In this set of embodiments, HDPE foam articles are produced that have a shape essentially identical to that of a continuous extrudate or a shape essentially identical to that of the interior of a mold. That is, the foam articles are produced by continuous extrusion, or molding, including blow-molding. Although some cell growth can occur following extrusion, or following molding, the articles retain shapes that are closely reminiscent of the extrudate or of the mold. This is to distinguish articles that are extruded or molded in an un-foamed state, and then later foamed by, for example, saturation with blowing agent and expansion, as occurs in typical prior art batch processes.

Referring now to FIG. 1, a system 6 for the production of HDPE foam is illustrated schematically. An extruder 8 includes a screw 38 that rotates within a barrel 32 to convey, in a downstream direction 33, polymeric material in a processing space 35 between the screw and the barrel. Although not shown in detail, screw 38 includes feed, transition, gas injection, mixing, and metering sections. The polymeric material is extruded through a die 37 fluidly connected to processing space 35 and fixed to a downstream end 36 of barrel 32. Die 37 is configured to form an extrudate 39 of HDPE foam in the desired shape, as described further below.

Extrusion screw is operably connected, at its upstream end, to a drive motor 40 which rotates the screw within barrel 32. Positioned along barrel 32, optionally, are temperature control units 42. Control units 42 can be electrical heaters, can include passageways for temperature control fluid, and or the like. Units 42 can be used to heat a stream of pelletized or fluid polymeric material within the barrel to facilitate melting, and/or to cool the stream to control viscosity and, in some cases, blowing agent solubility. The temperature control units can operate differently at different locations along the barrel, that is, to heat at one or more locations, and to cool at one or more different locations. Any number of temperature control units can be provided. Temperature control units also can be supplied to heat a die to which the extrusion system is connected.

Barrel 32 is constructed and arranged to receive a precursor of polymeric material. As used herein, "precursor of polymeric material" is meant to include all materials that are fluid, or can form a fluid and that subsequently can harden to form HDPE foam article. Typically, the precursor is defined by HDPE polymer pellets, and can include other species such as processing aids, fillers and nucleating agents.

Introduction of the pre-polymeric precursor, typically, utilizes a standard hopper 44 for containing pelletized polymeric material to be fed into the extruder barrel through orifice 46, although a precursor can be a fluid prepolymeric material injected through an orifice and polymerized within the barrel via, for example, auxiliary polymerization agents. In connection with the present invention, it is important only that a fluid stream of polymeric material be established in the system. From hopper 44 pellets are received into the feed section of screw and conveyed in a downstream direction in polymer processing space 35 as the screw rotates. Heat from extrusion barrel 32 and shear forces arising from the rotating screw, act to soften the pellets within the transition section. Typically, by the end of the first metering section the softened pellets have been gelated, that is, welded together to form a uniform fluid stream substantially free of air pockets.

Microcellular material production according to the present invention preferably uses a physical blowing agent, that is, an agent that is a gas under ambient conditions. In embodiments in which a physical blowing agent is used, along barrel 32 of extruder 30 is a port 54 in fluid communication with a source 56 of a physical blowing agent. Any of a wide variety of physical blowing agents known to those of ordinary skill in the art such as hydrocarbons, chlorofluorocarbons, nitrogen, carbon dioxide, and the like, and mixtures, can be used in connection with the invention and, according to a preferred embodiment, source 56 provides carbon dioxide, or nitrogen, or a mixture thereof as a blowing agent. Supercritical fluid blowing agents are preferred, particularly supercritical carbon dioxide and/or nitrogen. Where a supercritical fluid blowing agent is used, a single-phase solution of polymeric material and blowing agent is created having viscosity reduced to the extent that extrusion and blow-molding is readily accomplished even with material of melt flow no more than about 0.2 g/10 min. In particularly preferred embodiments solely carbon dioxide or nitrogen, respectively, is used. In some embodiments carbon dioxide is used in combination with other blowing agents such as nitrogen, and in other embodiments carbon dioxide is used alone with no other blowing agents present. In other embodiments carbon dioxide can be used with other blowing agents so long as the other blowing agents do not materially alter the blowing process. When nitrogen is used, similarly it can be used alone, in combination with another blowing agent that adds to or changes the blowing agent properties, or in combination with another agent that does not materially change the blowing process.

A pressure and metering device 58 typically is provided between blowing agent source 56 and port 54. Device 58 can be used to meter the blowing agent so as to control the amount of the blowing agent in the polymeric stream within the extruder to maintain a level of blowing agent at a particular level. In a preferred embodiment, device 58 meters the mass flow rate of the blowing agent. The blowing agent is generally less than about 15% by weight of polymeric stream and blowing agent. According to one set of embodiments, blowing agent is added in an amount of between about 1% and 15% by weight, preferably between about 3% and 12% by weight, more preferably between about 5% and 10% by weight, more preferably still between about 7% and 9% by weight, based on the weight of the polymeric stream and blowing agent. In other embodiments very low levels of blowing agents are suitable, for example less than about 3%, less than about 2%, or less than about 1.5% by weight blowing agent. These blowing agent levels can find use, in some instances, where a nucleating agent is used.

The pressure and metering device can be connected to a controller (not shown) that also is connected to drive motor 40 and/or a drive mechanism of a gear pump (not shown) to control metering of blowing agent in relationship to flow of polymeric material to very precisely control the weight percent blowing agent in the fluid polymeric mixture.

In some embodiments the method involves introducing, into fluid polymeric material flowing at a rate of at least about 10 lbs/hr., a blowing agent that is a gas under ambient conditions, and, in a period of less than about I minute, creating a single-phase solution of the blowing agent fluid in the polymer. In preferred embodiments, the rate of flow of the fluid polymeric material is at least about 40 or 60 lbs/hr., more preferably at least about 80 lbs/hr., and in a particularly preferred embodiment greater than at least about 100 lbs/hr. and the blowing agent fluid is added and a single-phase solution formed within one minute with blowing agent present in the solution in an amount of at least about 1% by weight, in some cases at least about 3% by weight, in other cases at least about 5% by weight, in other cases at least about 7%, and in still other cases at least about 10% (although, as mentioned, in another set of preferred embodiments lower levels of blowing agent are used). In these arrangements, at least about 2.4 lbs per hour blowing agent, preferably $CO_2$, is introduced into the fluid stream and admixed therein to form a single-phase solution. The rate of introduction of blowing agent is matched with the rate of flow of polymer to achieve the optimum blowing agent concentration.

Although port 54 can be located at any of a variety of locations along the barrel, according to a preferred embodiment it is located just upstream from a mixing section 60 of the screw and at a location 62 of the screw where the screw includes unbroken flights.

Figure 2:
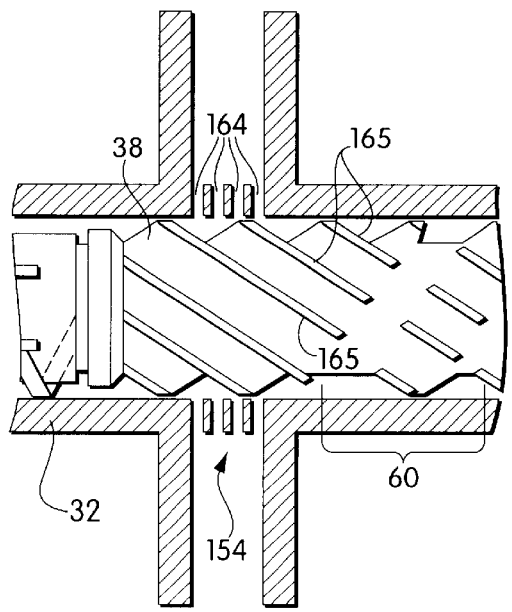
FIG. 2 illustrates a multihole blowing agent feed orifice arrangement and extrusion screw.

Referring now to FIG. 2, a preferred embodiment of the blowing agent port is illustrated in greater detail and, in addition, two ports on opposing top and bottom sides of the barrel are shown. In this preferred embodiment, port 154 is located in the gas injection section of the screw at a region upstream from mixing section 60 of screw 38 (including highly-broken flights) at a distance upstream of the mixing section of no more than about 4 full flights, preferably no more than about 2 full flights, or no more than 1 full flight. Positioned as such, injected blowing agent is very rapidly and evenly mixed into a fluid polymeric stream to promote production of a single-phase solution of the foamed material precursor and the blowing agent.

Port 154, in the preferred embodiment illustrated, is a multi-hole port including a plurality of orifices 164 connecting the blowing agent source with the extruder barrel. As shown, in preferred embodiments a plurality of ports 154 are provided about the extruder barrel at various positions radially and can be in alignment longitudinally with each other. For example, a plurality of ports 154 can be placed at the 12 o'clock, 3 o'clock, 6 o'clock, and 9 o'clock positions about the extruder barrel, each including multiple orifices 164. In this manner, where each orifice 164 is considered a blowing agent orifice, the invention includes extrusion apparatus having at least about 10, preferably at least about 40, more preferably at least about 100, more preferably at least about 300, more preferably at least about 500, and more preferably still at least about 700 blowing agent orifices in fluid communication with the extruder barrel, fluidly connecting the barrel with a source of blowing agent.

Also in preferred embodiments is an arrangement (as shown in FIG. 2) in which the blowing agent orifice or orifices are positioned along the extruder barrel at a location where, when a preferred screw is mounted in the barrel, the orifice or orifices are adjacent full, unbroken flights 165. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices 154 are positioned at a distance of from about 15 to about 30 barrel diameters from the beginning of the screw (at upstream end 34).

Referring again to FIG. 1, mixing section 60 of screw 38, following the gas injection section, is constructed to mix the blowing agent and polymer stream to promote formation of a single phase solution of blowing agent and polymer. The mixing section includes unbroken flights which break up the stream to encourage mixing. Downstream the mixing section, a metering section builds pressure in the polymer-blowing agent stream before die 37.

Die 37 includes inner passageways having shape and dimensions (die geometry) to control the shape of the extrudate. The die, in this embodiment, can have any of a variety of configurations, as is known in the art, to produce microcellular foam in specific forms, for example, sheets, profiles, or strands. Dies described in international patent publication no. WO 98/08667 incorporated herein by reference can be used. Particularly preferred dies for production of HDPE foams are described further below.

In addition to shaping extrudate released from such a die, the die can also perform the function of nucleating the single-phase solution of polymeric material and blowing agent. As the pressure in the single-phase solution drops as the solution flows through die internal passageways, solubility of the blowing agent in the polymer decreases, which is the driving force for cell nucleation. The extent of pressure drop depends upon the dimensions of the passageway. Specifically, the dimensions that effect pressure dropping include the shape of the passageway, the length of the passageway, and the thickness of the passageway. Under processing conditions, the pressure drop across the die is generally greater than 1,000 psi, preferably greater than 2,000 psi, and more preferably greater than 3,000 psi.

Dies of the invention can be also configured, as known in the art, to provide a pressure drop rate (dP/dt) as the single-phase solution flows across the passageway. Pressure drop rate, which depends upon die geometry and flow rate, also effects the cell nucleation process. Typically, a sufficient pressure drop rate must be induced to achieve appropriate nucleation conditions for microcellular material. In certain cases, it is desirable to use a process that employs low pressure drop rates. Lower pressure drop rates, generally, allow for more freedom in die construction and resulting article dimensions. In certain embodiments, the pressure drop rate in the solution is less than 1.0 GPa/s, in some embodiments less than 0.10 GPa/s, and, in some embodiments less than 0.05 GPa/s. In other embodiments, higher pressure drop rates are utilized, for example, in the production of certain thin products. In some cases, the pressure drop rate is greater than 1.0 GPa/s, in others greater than 5.0 GPa/s, and in others greater than 10.0 GPa/s.

In another embodiment, not illustrated, the pressure drop rate is induced in at least one nucleating pathway prior to, or within the die. Such configurations are described in co-pending international patent publication no. WO 98/08667 published Mar. 5. 1997 and incorporated herein by reference.

As a result of elevated temperatures, extrudate 39 that is released from the die is typically soft enough so that the nucleated cells grow. As the extrudate cools in the atmosphere and becomes more solid, cell growth is restricted. In certain embodiments, it is advantageous to provide external cooling means to speed the cooling rate of the extrudate. For example, in these embodiments, cooling may be accomplished by blowing air on the extrudate, contacting the extrudate with a cool surface, or submerging the extrudate in a liquid medium. Other equipment (not illustrated) downstream of the die can be used, as required, for additional shaping of the extrudate into a final form.

Figure 3:
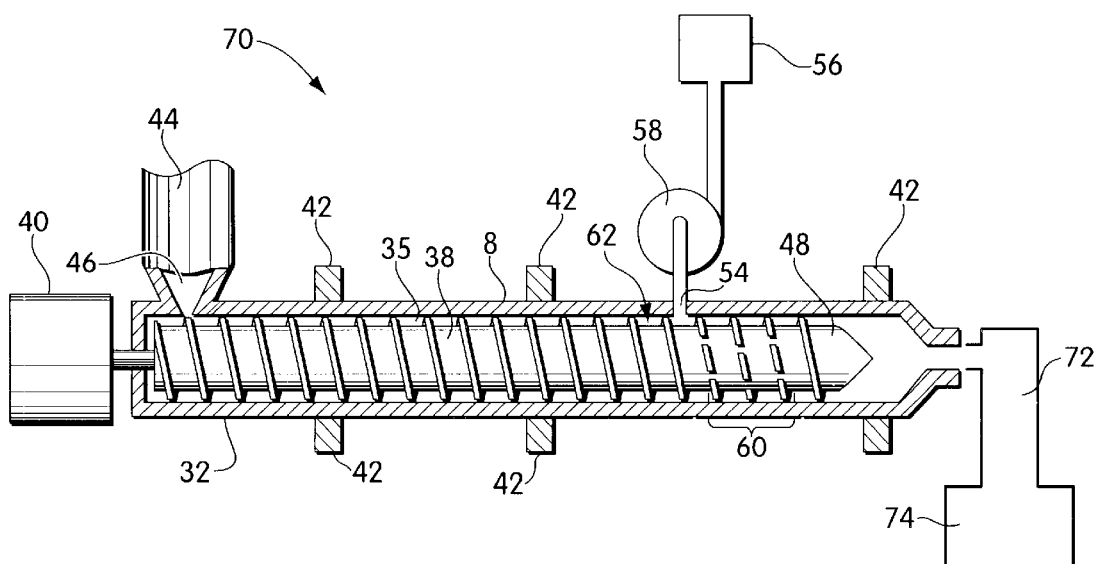
FIG. 3 is a schematic illustration of an injection blow molding system.

In other embodiments, the system of FIG. 1 is modified, as known in the art, to function as injection molding systems or blow molding systems. Particularly preferred injection molding systems are described in international patent publication no. WO 98/31521, which is incorporated by reference. Generally, injection molding systems do not include an extrusion die, but rather include a pathway fluidly connected to the polymer processing space through which the polymer and blowing agent solution is injected into the mold. FIG. 3 schematically illustrates a blow molding system 70 and particularly preferred blow molding systems are described in U.S. Patent application Ser. No. 60/068,173, which is incorporated by reference. Generally, blow molding systems employ parison forming dies and a blow mold that receives the parison of microcellular material out of the die.

Referring to FIG. 3, a blow molding system 70 includes extruder 8 fluidly connected to a blow-molding extrusion die 72 fluidly connected to extruder 8, and a blow mold 74 positionable to receive a parison of microcellular material from the outlet of the die. Blow mold 74 can be a conventional mold, and is not described in detail here except to say that foam parisons of the invention can be blow molded without heating, thus mold 74 need not include auxiliary heating systems. That is, a foam parison of the invention, in some cases a microcellular foam parison, can be extruded and then blow molded in mold 74 without applying heat to the parison in the mold. The invention provides, in another aspect, specific die designs that are useful for making high quality HDPE foam extrudate. Generally, the die is constructed to provide HDPE sheet or tubes of thin walls. More specifically, the die can be constructed to provide HDPE parisons for blow molding applications. In this aspect the invention involves the discovery that a specific range of taper angles of a converging nucleating microcellular polymeric die provides HDPE extrudate, including parisons for blow molding, that do not strip, or tear in the extrusion process and that are more uniform in surface appearance.

Figure 4:
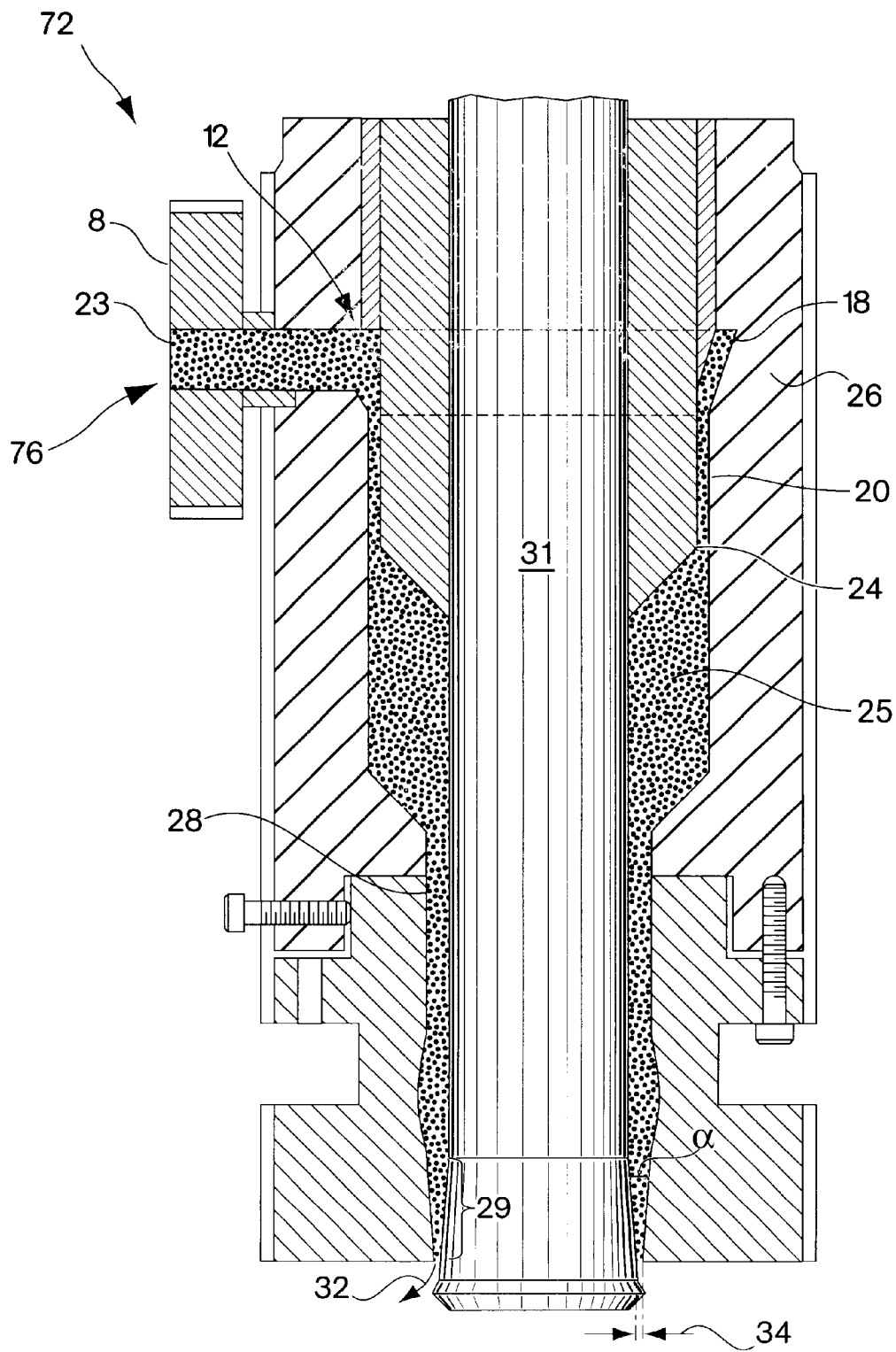
FIG. 4 is a schematic illustration of a die for the injection blow molding system of FIG. 3.

Referring now to FIG. 4, a die 72 of the invention is illustrated schematically in cross-section and includes an annular outer die body 26 surrounding an inner die body 24 which, in turn, surrounds an inner mandrel 31. The die includes a fluid inlet 76, constructed and arranged to receive a single-phase, homogeneous solution 23 of polymeric fluid and blowing agent that is a gas under ambient conditions, defined by the junction of the outlet of extruder 30 and a sidewall entrance of the die. Fluid inlet 76 communicates with an annular ring-like void 18 between the outer die body and inner die body that is in fluid communication with an annular channel 20 defined as a gap between the inner die body 24 and outer die body 26. Channel 20 fluidly communicates with an annular section 28 of the die that is of greater width than that of channel 20. Section 28 communicates, in turn, with a narrowed annular portion 29 defining a nucleating pathway having dimensions that create a rapid pressure drop facilitating nucleation of the single-phase solution fed to the die. At its downstream end nucleating pathway 29 fluidly communicates with an exit 32 of the die having a gap 34. Nucleating pathway 29 preferably decreases in cross-section in a downstream direction with an included angle α, as described further below. Decreasing the cross-sectional dimension of nucleating pathway 29 in a downstream direction provides particularly high pressure drop rates, as described in U.S. patent application Ser. No. 08/777,709 and International patent application Ser. No. PCT/US97/15088, incorporated by reference. Where the pathway decreases in cross-sectional dimension in a downstream direction, a single-phase solution can be continuously nucleated by experiencing continuously decreasing pressure within successive, continuous portions of the flowing, single-phase stream at a rate which increases.

Die 72 is constructed such that inner die body 24 can move axially relative to outer die body 26. Inner die body 24 can move from an upstream position as illustrated in FIG. 4 to a downstream position in which it almost fills a region indicated as 25. Thus, when inner die body 24 is positioned in an upstream position as illustrated in FIG. 4, region 25 defines an accumulator.

In operation, a single-phase solution 23 of polymeric material and blowing agent is fed from extruder 30 to the die 72, first into annular ring 18, then through channel 20, accumulator 25 (to the extent that inner die body 24 is positioned upstream) and section 28 of the die as a single-phase, non-nucleated solution, is nucleated through a rapid pressure drop occurring at nucleating pathway 29, and is extruded at exit 32 as a parison suitable for blow molding. When it is desired to use the accumulating feature of die 72, exit 32 can be closed (described below) and non-nucleated, single-phase solution 23 of polymeric material and blowing agent can be fed from extruder 30 into accumulator 25 while inner die body 24 moves in an upstream direction. A load can be applied to inner die body 24 in a downstream direction, during this procedure, to maintain in accumulator 25 an essentially constant pressure that maintains the polymer/blowing agent solution in a non-nucleated, single-phase condition. Then, exit 32 can be opened and inner die body 24 driven in a downstream direction to nucleate and extrude a microcellular parison. This feature allows for an extruder to be run continuously while parison extrusion occurs periodically.

While polymeric material nucleated in nucleating pathway 29 can include nucleating agent in some embodiments. in other embodiments no nucleating agent is used. In either case, the pathway is constructed so as to be able to create sites of nucleation in the absence of nucleating agent. In particular, the nucleating pathway has dimensions creating a desired pressure drop rate through the pathway. In one set of embodiments, the pressure drop rate is relatively high, and a wide range of pressure drop rates are achievable. A pressure drop rate can be created, through the pathway, of at least about 0.1 GPa/sec in molten polymeric material admixed homogeneously with about 6 wt % $CO_2$ passing through the pathway of a rate of about 40 pounds fluid per hour. Preferably the dimensions create a pressure drop rate through the pathway of at least about 0.3 GPa/sec under these conditions, more preferably at least about 1 GPa/sec, more preferably at least about 3 GPa/sec, more preferably at least about 5 GPa/sec, and more preferably still at least about 7, 10, or 15 GPa/sec. The nucleator is constructed and arranged to subject the flowing stream to a pressure drop at a rate sufficient to create sites of nucleation at a density of at least about $10^7$ or, preferably, $10^8$ sights/cm$^3$. The apparatus is constructed and arranged to continuously nucleate a fluid stream of single-phase solution of polymeric material and blowing agent flowing at a rate of at least 20 lbs/hour, preferably at least about 40 lbs/hour, more preferably at least about 60 lbs/hour, more preferably at least about 80 lbs/hour, and more preferably still at least about 100, 200, or 400 lbs/hour.

Die 72 is constructed such that mandrel 31 can move axially relative to the remainder of the die. This allows for exit 32 to be closed, if desired, by moving mandrel 31 in an upstream direction so as to seal the inner die lip against the outer die lip.

Included angle α of die 72 defines a particular time between initiation of nucleation in the die and release from the die exit, and this timing defines another aspect of the invention. Specifically, methods are provided that involve releasing a nucleated stream as a polymeric microcellular extrudate from an outlet of a die in a period of time of no more than about 0.002 seconds, or no more than about 0.001 seconds, after nucleation, within the die, of a single-phase, non-nucleated solution of polymeric material and blowing agent.

The invention involves the discovery of a problem in the extrusion of HDPE sheet or thin profiles. It has been discovered that under microcellular extrusion conditions where a parallel type nucleator is used extrudate, especially HDPE parisons for blow molding, tend to strip during the extrusion process. Normal microcellular conditions, in these cases, are described by using a nucleator that creates the necessary pressure drop rate required to form small cells and using typical conditions of blowing agent content and melt temperature. Stripping is defined as a condition in which extrudate, upon exiting a die, tears at one or more locations along the length of the die. This tearing interferes with the formation of a uniform extrudate, resulting in the formation of long, thin strips of microcellular material. Each strip is the result of the complete severing of the extrusion at each of the locations of the observed tear. This phenomena has been observed in HDPE and has not been observed in other materials tested, including polypropylene, and is thought to be caused by the highly linear nature of the HDPE molecule and the ease with which the molecules slip past one another under low force.

The problem of HDPE stripping is alleviated according to the invention by using a tapered die (a die that decreases in cross section in a downstream direction) of a very specific included angle α. The included taper angle minimum is dictated by the ability to overcome this stripping problem and still provide a minimum pressure drop rate necessary to make microcellular material. Angles of less than about 4 degrees do not generate the required pressure drop rate for microcellular material at commercially reasonable rates and at acceptable total pressure drops. At angles of 6 degrees and greater, a sufficient pressure drop rate can be achieved and the stripping problem is completely overcome. A maximum angle exists that still makes an acceptable structure. A angles greater than about 18 degrees, the microcellular structure tends to blow itself apart, resulting in very poor cell structures for blow molding purposes.

In a particularly preferred embodiment, nucleating pathway 29 decreases in cross section in a downstream direction with an included angle α of greater than 4°. Preferably, included angle α is greater than 6°. In one embodiment the included angle is between 4° and 18°, preferably between 4° and 8°. "Included angle", as used herein, means the total angle of downstream-direction taper. For example, in an annular die in which the exterior wall tapers inwardly at 4° and the interior wall, defined by the exterior of a mandrel, has no taper, the included angle is 4°. In an identical situation in which the mandrel tapers outwardly at 2°. the included angle would be 6°.

The result of stripping prevention was unexpected. Although not wishing to be bound by any theory, it is believed that the tapered die works because there is a critical location where the beginning of nucleation occurs. This location is defined by the point at which the pressure in the polymer/blowing agent melt (single-phase, non-nucleated solution of polymeric material and blowing agent) is reduced below the saturation pressure of the blowing agent in the polymer. If this location is too far away from the exit of the die (measured not by distance, but by residence time or the time it takes the nucleated polymer to travel from the initial nucleation point to the end of the die where release of polymer extrudate occurs), then stripping occurs when shear forces on the growing cell acts for too long a time resulting in tearing of the melt. If the location is closer to the exit than this critical point, then the foaming melt does not undergo enough shear to cause tearing. In parallel nucleators, where pressure drop rate is constant throughout the nucleation land length and pressure decreases linearly throughout the nucleator, the point of nucleation occurs too far from the exit of the die. In tapered dies, where pressure drop rate increases throughout the nucleator and pressure decreases mostly near the die exit, the point of nucleation is very close to the die exit. The result is that shearing acts over only a short period of time and no stripping occurs. The proposed theory compels selection of a specific taper angle that both eliminates stripping and allows for the standard conditions of pressure drop rate to be met.

Foam material produced according to the invention can be used in blow molding processes, for example in production of blow molded bottles. Additionally, sheets of microcellular polymeric material, including microcellular HDPE, either in flat die or annular die designs, can be made. Material made with systems of the invention also can be thermoformed. In one embodiment, the die of the invention provides the ability to change parison thickness by movement of the inner pin of the die with respect to the outer die body.

In addition to die angle and gap opening, the specific dies can also be described by the pressure and pressure drop rate needed to make defect free, microcellular parisons.

The function and advantage of these and other embodiments of the present invention will be more fully understood from the examples below. The following examples are intended to illustrate the benefits of the present invention, but do not exemplify the full scope of the invention.

EXAMPLE 1
System for Blow Molding

A tandem extrusion line including a 2½ inch, 32:1 L/D single screw primary extruder (Akron Extruders, Canal Fulton, Ohio) and a 3 inch 36:1 L/D single screw secondary extruder (Akron Extruders, Canal Fulton, Ohio) was arranged in a parallel configuration. A volumetric feeder capable of suppling up to 30 lb/hr was mounted in the feed throat of the primary extruder such that compounded talc additive pellets could be metered into the primary extruder. An injection system for the injection of $CO_2$ into the secondary was placed at approximately 8 diameters from the inlet to the secondary. The injection system included 4 equally spaced circumferential, radially-positioned ports, each port including 176 orifices, each orifice of 0.02 inch diameter, for a total of 704 orifices. The injection system included an air actuated control valve to precisely meter a mass flow rate of blowing agent at rates from 0.2 to 12 lbs/hr at pressures up to 5500 psi.

The screw of the primary extruder was specially designed to provide feeding, melting and mixing of the polymer/talc concentrate followed by a mixing section for the dispersion of blowing agent in the polymer. The outlet of this primary extruder was connected to the inlet of the secondary extruder using a transfer pipe of about 24 inches in length.

The secondary extruder was equipped with specially designed deep channel, multi-flighted screw to cool the polymer and maintain the pressure profile of the microcellular material precursor, between injection of blowing agent and entrance to a gear pump (LCI Corporation, Charlotte, N.C.) attached to the exit of the secondary. The gear pump was equipped with an integral jacket for heating/cooling and sized to operate at a maximum output of 250 lb/hr with a rated maximum discharge pressure of 10,000 psi.

The system was equipped, at exit from the gear pump, with a die adapter and a vertically mounted blow molding die (Magic Company, Monza, Italy). The die adapter was equipped with taps for measurement of melt temperature and pressure just prior to entry into the die. The blow molding head included a conventional spider type flow distribution channel and a die adjustment system that allowed movement of the die relative to the fixed position tip providing a variety of exit gaps depending on the chosen tooling.

A two-piece bottle mold was mounted in a fixture for the hand molding of sample bottles as a secondary process. One half of the mold was mounted stationary in the fixture with the other half mounted on linear slides. Quick acting clamps mounted on the stationery half of the mold provided the mechanism to clap the mold shut. A short section of steel tubing sharpened to a point attached to a 0–50 psi regulator using a length of flexible hose provided the blow system. Mold diameter varied from approximately 1 inch in the cap area to 2 to 3 inches in the body of the bottle. The overall cavity length of the bottle mold was approximately 10 inches.

EXAMPLE 2
Extrusion System

A tandem extrusion line as described in Example 1 was used with the exception that the gear pump was removed and that the die adapter was attached directly to the exit of the secondary extruder.

EXAMPLE 3
Comparative; Stripped Parison Formation

High density polyethylene (Equistar LR 5403) pellets were introduced into the main hopper of the extrusion line described in Example 2. The tooling attached to the blow molding head included a die with a 1.227 exit diameter and a tip of 1.181 exit diameter and 2° taper angle. This tooling configuration provided an exit gap of 0.023 inches and an included taper angle of 2°.

The extruder was adjusted to provide an output of approximately 140 lb/hr at speeds of approximately 58 rpm on the primary and 25 rpm on the secondary. Secondary barrel temperatures were set to maintain a melt temperature of approximately 305° F. at entrance to the die. The volumetric feeder was turned off and no compounded talc was added. $CO_2$ blowing agent was injected at a nominal rate of 4.8 lb/hr resulting in a 3.4% by polymer weight blowing agent in the material.

At the above conditions, the time to die exit from the point of nucleation of the polymer was approximately 0.060 seconds. These conditions produced stripping of the product.

EXAMPLE 4
Parison Formation

High density polyethylene (Equistar LR 5403) pellets were introduced into the main hopper of the extrusion line described in example 1. The tooling attached to the blow molding head included a die with a 0.685 exit diameter and a tip of 0.623 exit diameter and 2° taper angle. This tooling configuration provided an exit gap of 0.031 inches and an included taper angle of 4°.

The extruder and gear pump rpm were adjusted to provide an output of approximately 216 lb/hr at speeds of approximately 78 rpm on the primary, 32 rpm on the secondary and 50 rpm on the gear pump. Secondary barrel temperatures were set to maintain a melt temperature of approximately 315° F. at entrance to the die. The additive feeder was set to provide an output of approximately 11 lb/hr resulting in a 2.7% by polymer weight talc in the material. $CO_2$ blowing agent was injected at a nominal rate of 2.2 lb/hr resulting in a 1.0% by polymer weight blowing agent in the material.

At the above conditions, the time to die exit from the point of nucleation of the polymer was approximately 0.002 seconds. These conditions produced good foam with an average cell size of approximately 70 microns without stripping.

EXAMPLE 5

Parison Formation

High density polyethylene (Equistar LR 5403) pellets were introduced into the main hopper of the extrusion line described in example 1. The tooling attached to the blow molding head included a die with a 0.661 exit diameter and of 4° taper angle and a tip of 0.633 exit diameter and 2° taper angle. This tooling configuration provided an exit gap of 0.014 inches and an included taper angle of 6°.

The extruder and gear pump rpm were adjusted to provide an output of approximately 212 lb/hr at speeds of approximately 62 rpm on the primary, 37 rpm on the secondary and 50 rpm on the gear pump. Secondary barrel temperatures were set to maintain a melt temperature of approximately 315° F. at entrance to the die. The additive feeder was set to provide an output of approximately 11 lb/hr resulting in a 2.7% by polymer weight talc in the material. $CO_2$ blowing agent was injected at a nominal rate of 3.2 lb/hr resulting in a 1.5% by polymer weight blowing agent in the material.

At the above conditions, the time to die exit from the point of nucleation of the polymer was approximately 0.003 seconds. These conditions produced good foam with an average cell size of approximately 19 microns without stripping.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method of forming a foam article comprising:
    conveying polymeric material in a downstream direction in a polymer processing apparatus, the polymeric material consisting essentially of high-density polyethylene;
    introducing a physical blowing agent into the polymeric material in the polymer processing apparatus; and
    forming a molded foam article from the polymeric material wherein the said polymeric material is essentially free of residual chemical blowing agents or by-products of chemical blowing agents.

2. The method of claim 1, wherein the blowing agent comprises carbon dioxide.

3. The method of claim 1, wherein the blowing agent comprises nitrogen.

4. The method of claim 1, comprising molding the polymeric material in an injection mold connected to a downstream end of the polymer processing space to form the foam article.

5. The method of claim 1, comprising blow molding the foam article.

6. The method of claim 1, wherein the foam article has an average cell size of less than 100 microns.

7. The method of claim 1, wherein the foam article has an average cell size of less than 50 microns.

8. The method of claim 1, wherein the foam article has an average cell size of less than 20 microns.

9. The method of claim 1, wherein the foam article has a void volume of greater than 10%.

10. The method of claim 1, wherein the foam article has a void volume of greater than 20%.

11. The method of claim 1, wherein the foam article has a void volume of greater than 50%.

12. The method of claim 1, wherein the foam article has a void volume of greater than 10% and less than 50%.

* * * * *